March 25, 1958  C. H. SCHWANKL  2,828,155
HANDLING TONGS
Filed Aug. 23, 1955
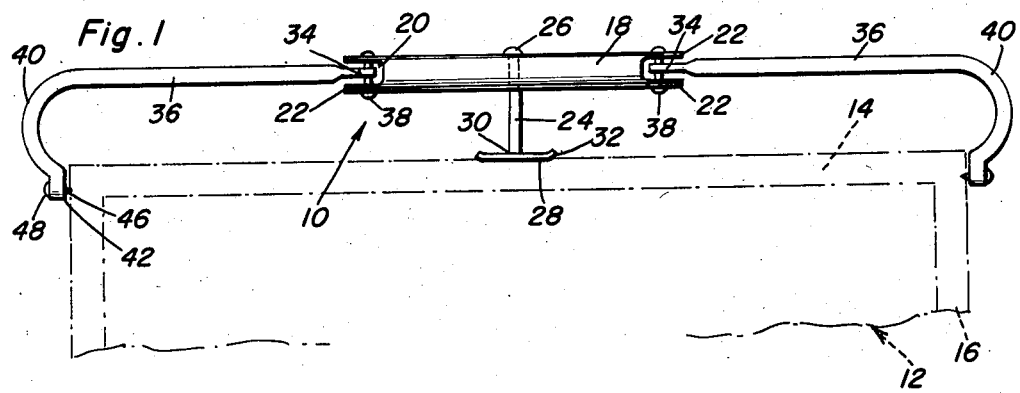
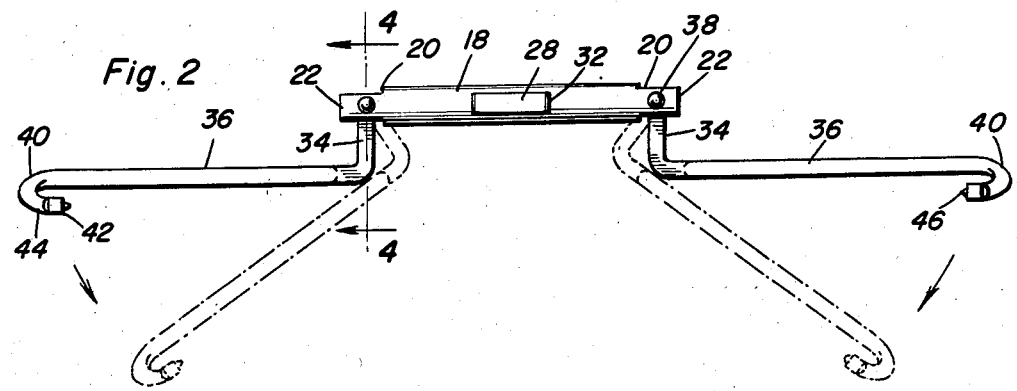
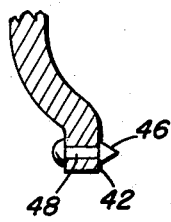
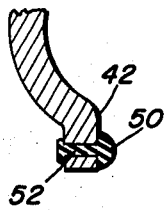
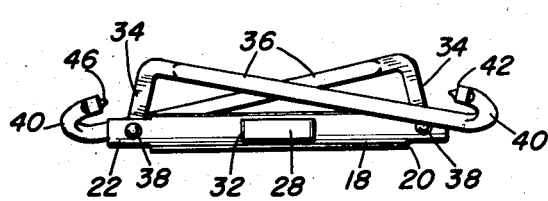
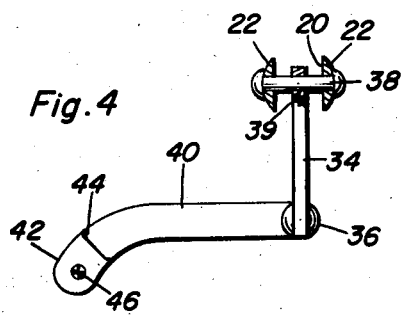
Clarence H. Schwankl
INVENTOR.

United States Patent Office 2,828,155
Patented Mar. 25, 1958

2,828,155

HANDLING TONGS

Clarence H. Schwankl, International Falls, Minn.

Application August 23, 1955, Serial No. 530,065

1 Claim. (Cl. 294—16)

This invention generally relates to tongs, and more specifically provides handling tongs especially adapted for use with containers.

An object of the present invention is to provide a pair of handling tongs which may be employed for raising a horizontally disposed container, such as a box, wherein the tongs may be detachably connected to the container for vertical lifting movement thereof.

In the construction of the present invention, the tongs are employed substantially in the same manner as a handle normally mounted on the vertically disposed end wall of a container, wherein it is desirable to raise the vertically disposed end wall of the container by vertical movement of the handle, wherein the tongs employ a pair of pivotal gripping members which curve around and engage the opposing surfaces of the vertical side walls of a container, together with a spacer engaging the vertical end wall for retaining the handle in spaced parallel relation to the end walls so that upward movement of the handle will cause the gripping members to bite into and engage the side wall of the container for lifting movement thereof.

Another important object of the present invention is to provide handling tongs especially adapted for containers which are simple in construction, easy to use, efficient in operation, constructed of relatively light and rugged material and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the handling tongs of the present invention illustrating the association thereof with a container illustrated in plan view;

Figure 2 is a side elevational view of the tongs of the present invention illustrating in dotted lines the disposition of the gripping members when containers of varying sizes are gripped;

Figure 3 is a side elevational view of the tongs of the present invention in folded position;

Figure 4 is a detailed sectional view taken substantially upon a plane passing along section line 4—4 of Figure 2 illustrating the notched end of the handle together with the supporting means for the gripping members;

Figure 5 is a detailed sectional view illustrating one form of projection on these gripping surfaces for engaging containers; and Figure 6 is a detailed sectional view somewhat similar to Figure 5 illustrating a modified form of gripping projection on the gripping surfaces of the gripping members for engaging opposite side walls of a container.

Referring now specifically to the drawings, the numeral 10 generally designates the handling tongs of the present invention for association with a square or rectangular container 12 which is provided with vertically disposed side and end walls wherein the end walls are designated by the numeral 14, and the side walls by the numeral 16.

The handling tongs of the present invention include a generally elongated cylindrical handle member 18 which is provided with inwardly extending notches 20 at each end thereof forming projecting furcations 22. A laterally extending spacer rod 24 extends through the central portion of the handle 18 and is secured thereto by suitable riveting over of the end portion 26 thereof and the other end is provided with a plate 28 secured thereto by suitable welding 30 or any other suitable fastening means. The plate 28 is provided with slightly laterally turned ends 32 wherein the plate 28 engages the outer surface of the end walls 14 of the container 12, thereby spacing the handle 18 therefrom in substantially spaced parallel relation and substantially in a horizontal position.

Pivotally supported between each pair of furcations 22 is an upstanding end 34 of a longitudinally extending gripping member 36. The upstanding inner end 34 is secured to the furcations 22 by a transverse pivot pin 38 and it will be noted in Figure 4 that the upstanding end 34 is loosely received on the pin 38 by the use of an enlarged aperture 39 through which the pin 38 extends, and the distance between the furcations 22 is more than the thickness of the upstanding member 34. The outer end of each of the gripping members 36 is provided with an offset reversely curved extension 40 which terminates in inwardly facing gripping surfaces 42 which are generally curved laterally and downwardly, as indicated by the numeral 44, to a point slightly below the longitudinal gripping member 36.

In Figure 5, the gripping surface 42 is provided with a projecting pointed member 46 in the form of a removable pin 48, and in Figure 6, the gripping surface 42 is provided with a projecting rounded resilient gripping member 50 in the form of a removable resilient pin or peg 52, thereby facilitating the gripping of various types of containers having smooth and rough surfaces and having surfaces which may be penetrated and those which may not be penetrated, due to the particular material in the container 12.

In use, the tongs 10 are positioned alongside the end wall 14 and the gripping projections 46 or 50 are brought into engagement with the opposing surfaces of the side walls 16 of the container 12 and the plate 28 brought into engagement with the outer surface of the end wall 14 after which the handle 18 may be lifted vertically wherein the end of the container 12 may be raised. The device may be employed for setting containers on one end from a horizontal position, or a pair may be employed for lifting a container 12 vertically as desired. The pivotal connection of the gripping members 36 permits the tongs 10 to be utilized for various sizes of containers, as generally demonstrated in the dotted line position of Figure 2, and the device may be folded into a compact position with the gripping members 36 crossed and alongside the handle member 18, as illustrated in Figure 3, and may be constructed of any suitable lightweight material.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

Handling tongs for gripping opposite sides of a container comprising an elongated handle, a pair of elongated gripping members extending oppositely from the ends of the handle, said gripping members comprising upstanding right angled inner ends terminally pivoted to the ends of the handle, said gripping members having outer gripping ends curved laterally with respect to said inner ends and handle to offset said outer ends from one side of said members and handle, and a bumper member extending laterally from said side of the handle to space said handle from said container.

References Cited in the file of this patent

UNITED STATES PATENTS

| | | |
|---|---|---|
| 1,014,079 | McKay | Jan. 9, 1912 |
| 1,249,723 | Danielson | Dec. 11, 1917 |
| 1,460,730 | Phelps | July 3, 1923 |
| 2,040,574 | Sutcliffe | May 12, 1936 |
| 2,212,754 | Smith | Aug. 27, 1940 |
| 2,367,252 | Williams | Jan. 16, 1945 |